Jan. 11, 1966     J. E. COORDES     3,228,547
HEAVY EQUIPMENT TRANSPORTERS
Filed Aug. 14, 1964     3 Sheets-Sheet 1

INVENTOR
JOHN E. COORDES
BY H. M. Saragovitz
E. J. Kelly
H. Berl and
E. P. Barthel
ATTORNEYS

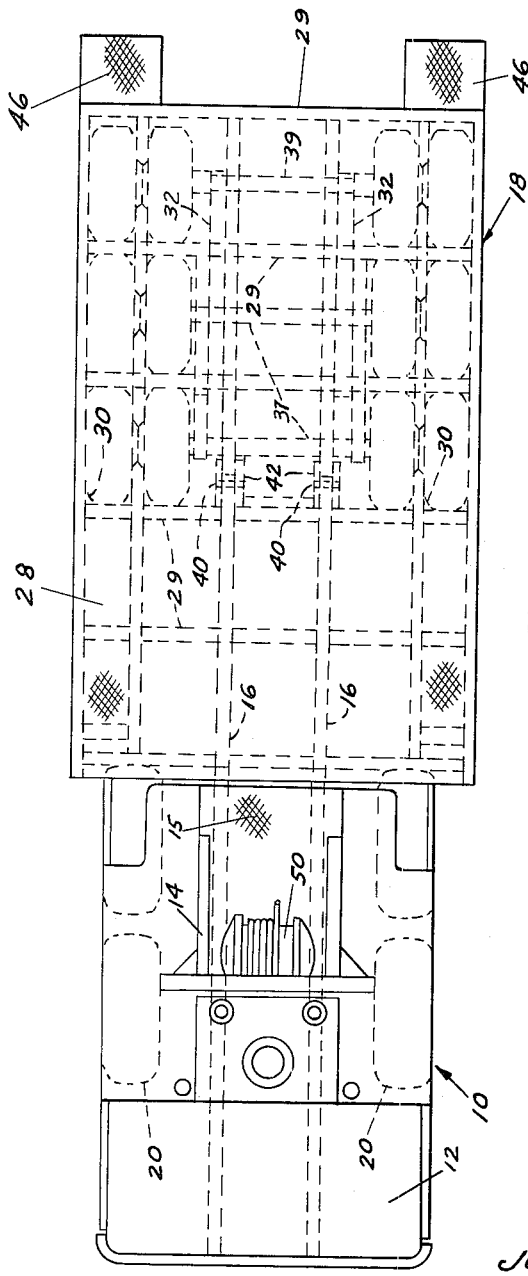

Jan. 11, 1966  J. E. COORDES  3,228,547
HEAVY EQUIPMENT TRANSPORTERS
Filed Aug. 14, 1964  3 Sheets-Sheet 3
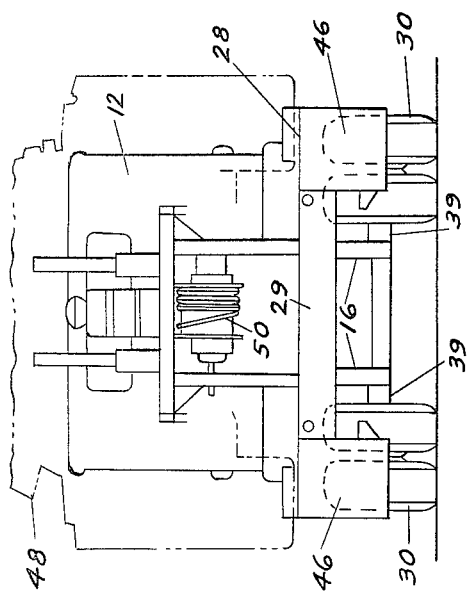
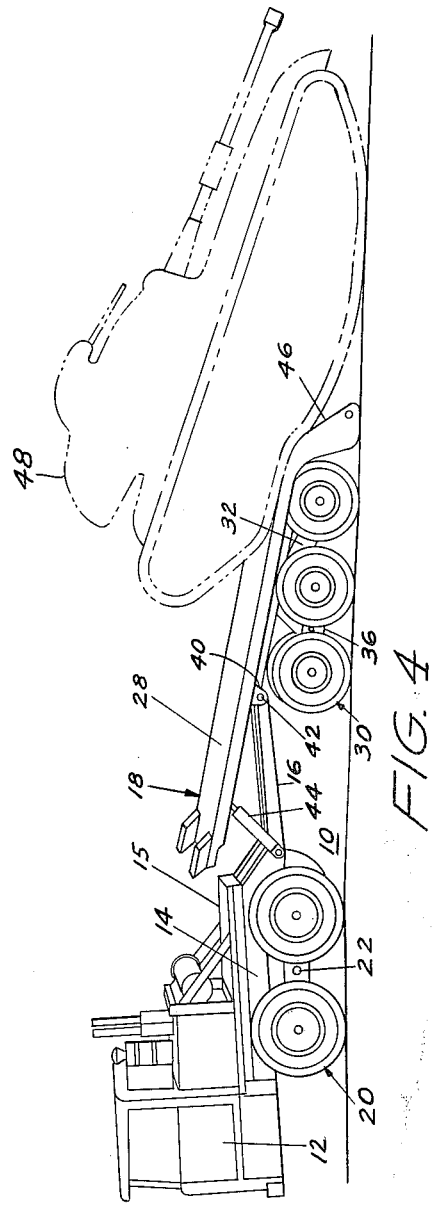
INVENTOR
JOHN E. COORDES
BY H. M. Saragovitz
E. J. Kelly
H. Berl and
E. P. Barthel
ATTORNEYS

United States Patent Office 3,228,547
Patented Jan. 11, 1966

3,228,547
HEAVY EQUIPMENT TRANSPORTERS
John E. Coordes, Birmingham, Mich., assignor to the United States of America as represented by the Secretary of the Army
Filed Aug. 14, 1964, Ser. No. 390,276
9 Claims. (Cl. 214—506)
(Granted under Title 35, U.S. Code (1952), sec. 266)

The invention described herein may be manufactured and used by or for the Government of the United States of America for governmental purposes without the payment of any royalties thereon or therefor.

The invention relates to improvements in heavy equipment transporters and more particularly to a heavy equipment transporter having a tilt-bed articulated frame that provides a maximum simplicity in loading tracked vehicles and/or cargo.

The transporter will be described in connection with transporting tracked vehicles, but it will be understood that the invention may be used to transport vehicles of all types as well as general cargo. Exceptionally large loads are frequently carried in commercial transportation and also in military operations. Present warfare, for example, requires the transporting of heavy equipment such as combat tanks in running order or disabled and the like. A transporter may be required to transport heavy vehicles over highways to conserve the vehicle life, to prevent damage to roads, or because the vehicle is not operable.

One object of the invention is to provide a transporter that will substantially reduce the amount of turning radius required to maneuver the vehicle.

Another object of the present invention is to provide a transporter that can be used to transport general cargo as well as vehicles of all types.

A further object of the invention is the provision of a transporter that is capable of being loaded and unloaded in a short space of time.

Still another object is to provide a transporter that allows an abnormally heavy tracked vehicle to be loaded without the necessity of stabilizing jacks.

Still a further object of the present invention is the provision of a transporter that allows the loading of tracked vehicles without the use of auxiliary ramps.

Other objects and advantages of the invention will hereinafter become more fully apparent from the following description of the annexed drawings, which illustrate a preferred embodiment, and wherein:

FIG. 2 is a plan view of the transporter embodying the invention;

FIG. 3 is a rear elevational view of the transporter embodying the invention;

FIG. 4 is a side view of the transporter having a tank partially loaded thereon, the transporter being shown with its front and rear frames in their maximum tilted position.

Figure 1:
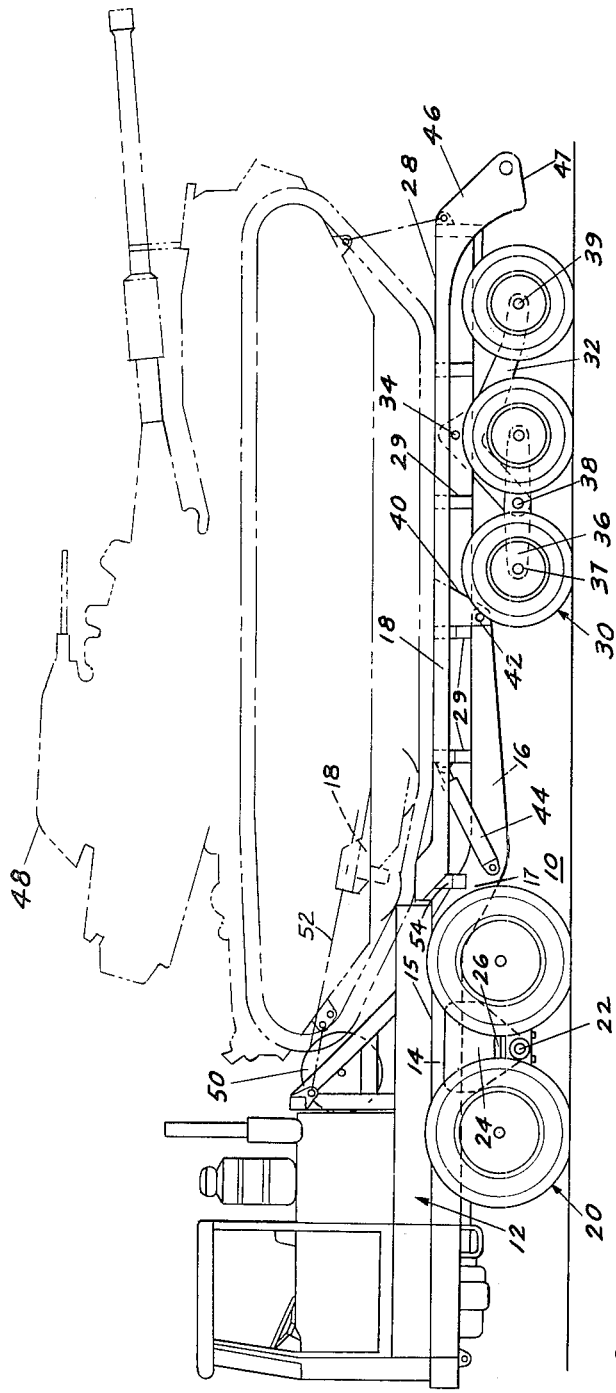
FIG. 1 illustrates a side elevation of the transporter having a tank fully loaded thereon, the transporter platform being shown in transport position in solid lines, and in loading position in dotted lines.

Referring now to the drawings, wherein like reference characters designate like or corresponding parts throughout the several views, there is shown in FIG. 1, a transporter 10. The vehicle is under control of an operator located within a cab mounted over engine type tractor generally indicated at 12 which is self-powered by means of a front wheel drive. The transporter includes a front chassis frame 14 having a floor 15 together with an offset extension 16 which is joined by means of a kick-up portion 17 thereby permitting the platform of the rear frame 18 and the front frame 14 to lie in a single plane. A bogie four-wheel drive assembly 20 is pivotally connected by trunnion pin 22 and support bracket 24 to the front frame while being sprung by a leaf spring 26. It will be noted that the top mounted tandem wheel arrangement 20 may be of conventional design such as, for example, a Rockwell-standard type front axle and suspension.

The rear frame 18 having cross beams 29 is supported by wheel assembly 30 which is pivotally linked to the side frame members by walking beam arms 32 and transverse pins 34. The auxiliary walking beam 36 supporting tandem axles 37 is pivotally joined by means of trunnion pin 38 to the forward end of arm 32. The tandem wheels supported by walking beam 36 can be sprung similar to the front wheels 20 and are shown with a simple beam for illustrative purposes only. The rear axle 39 is suitably mounted on the trailing extremity of arm 32 and dual wheels are mounted upon each end of the axle as is the case with the forward pair of axles 37.

The pivotal linkage between the front frame 14 and the rear frame 18 is provided by a suitable connection such as a pair of spaced apart brackets 40 which are secured to frame 18 and pivotally receive a pair of pins 42 therethrough that are fixedly secured to the rearmost bifurcated ends of front frame 14. It is to be noted that the length of the portion of the platform 28 rearwardly of the pivot 34 is substantially as long as the portion forwardly of the pivot 42. Also it will be noted that the length of the platform forwardly of pivot 34 is approximately twice that of the aft extending portion.

Interconnecting the front and rear frame members are a pair of hydraulic actuated pistons 44, the blind ends of which are pivotally connected adjacent the kick-up portion 17 of the front frame. The rods of the pistons are pivotally connected to the longitudinal members of the rear frame at a location that is substantially central to the portion forwardly of the pivot 42. The actuating pistons 44 are of the raise and hold type and as can be readily seen, when actuated will raise the rear frame 18 to the inclined position shown in dotted lines illustrated in FIG. 1.

The rear frame 18 has downwardly sloping overhanging end projections 46 which function as a pair of loading ramps whereby when the platform 28 is tilted to its maximum inclined position the transporter will load tracked vehicles without any auxiliary ramps, thus allowing minimum loading time (approximately five minutes for a live vehicle). The projections 46 have a large base portion 47 that allows them to function as stabilizing jack members when brought into flush contact with the ground. Auxiliary ramps (not shown) can be used to facilitate loading all wheeled vehicles, small tracked vehicles, and engineer type equipment. These ramps may be utilized with the platform flat or tilted, or may be utilized to load vehicles processed for storage.

The operational sequence in loading a tracked vehicle on the transporter will now be set forth. In the case of a live or disabled tank sitting on the ground or other supporting surface, the transporter is backed up so that the rear frame is at or in close proximity to the front of the tank. The front and rear frames are unlocked at the juncture indicated at 54 in FIG. 1 whereupon operation of the power cylinders 44 will cause the rear frame 18 and the front frame 14 to be tilted to their inclined positions by rotating about the pivot points 22, 34, and 42. It will be noted that the pivot points 22 and 34 remain relatively fixed while the pivot point 42, which is common to both frames, is raised upwardly an amount approximately equal to the downward travel of the base 47. The result is that a jacknife or toggle type joint is created between the frames wherein the front and rear wheel assemblies are subjected to opposed forces tending to bring the wheels towards each other thereby stabilizing the transporter during the initial loading operation.

As can best be seen in FIG. 4, the platform 28 assumes some acute angle with the horizontal while the front frame creates a lesser acute angle with the horizontal. In the particular embodiment shown the rear frame forms an angle of approximately 10° with the horizontal while the front frame assumes an angle of approximately 5° with the horizontal. The transporter brakes are now set so that a tracked vehicle can be driven aboard by means of the ramps 46. In the case of a disabled tank the hoist cable 52 has one end thereof connected to hydraulically operated winch 50 and the other end connected to the front of the tank. By operating appropriate controls the winch can be actuated to pull the tank 48 onto the platform. The tank is pulled or driven up the ramps and onto the platform until its center of gravity passes the pivot point 34 and it is substantially entirely supported on the rear chassis whereupon the platform will start to rotate towards its horizontal position shown in FIG. 1.

During this operation, the platform 28 will be prevented from being lowered too quickly by the cushioning effect of the hydraulic devices 44 together with the counter-weight balance produced by having the cab and engine 12 located forwardly of the pivot 22. When the front and rear frames reach their aligned horizontal overlapping positions, they are locked at the juncture 54 by any suitable means, as for example, sliding bolts, and the tank is advanced to its transporting position shown in FIG. 1. Tie-down links are provided at the forward and aft portions of the tank to secure the payload vehicle while it is being transported. In order to discharge the tank from the transporter, the operation is reversed. The tank can be moved rearwardly, causing the platform 28 to tilt until the base 47 of the ramps contacts the ground or bearing plates placed therebeneath.

It will be apparent that the loading, as well as the unloading, action is simplified and effects a substantial improvement in the amount of time required together with the elimination of men on the ground for attachment of ramps or the hitching of trailers. The flat deck of the transporter offers open cargo area, with no restrictions on rear overhang and considerable potential for front overhang, depending on the load. By using a front wheel drive arrangement the instant invention provides the necessary load capacity with a load bed only forty-two inches from the ground. This is the same approximate height as the bed on the semitrailers presently being utilized to transport heavy equipment.

Obviously many modifications and variations of the present invention are possible in the light of the above teachings. It is therefore to be understod that within the scope of the appended claims the invention may be practiced otherwise than as specifically described.

I claim:

1. In a transporter vehicle comprising in combination, a chassis having front and rear frames, said frames arranged so that the forward portion of said rear frame overlaps the rear portion of said forward frame, said rear portion of said front frame being offset horizontally whereby said rear frame and the forward portion of said front frame lie in a common horizontal plane, wheel assemblies associated with each of said frames, means pivotally connecting said wheel assemblies to said frames, a second pivotal means projecting downwardly from said rear frame thereby connecting the rearmost portion of said front frame to an intermediate portion of said rear frame forwardly of its associated wheel assembly, said second pivotal means permitting toggle-joint pivotal movement of said frames in the vertical plane whereby upon vertical movement of said front and rear frames, said pivoted wheel assemblies move rearwardly and forwardly thereby tilting said rear frame upwardly about said second intermediate pivot point and said pivotally connected wheel assemblies, permitting ease of loading and unloading of the transporter vehicle.

2. The structure of claim 1 further characterized by power means pivotally connected between said front and rear frames for tilting said frames about said wheel assemblies.

3. In a transporter vehicle comprising in combination, a chassis having front and rear frame members, said frames arranged so that the forward portion of said rear frame overlaps the rear portion of said forward frame, a first ground wheel assembly secured to said front frame by a first transverse pivotal connection, a second ground wheel tandem assembly being secured to a walking beam wherein said walking beam is secured to said rear frame by a second transverse pivotal connection, said front and rear frames being pivotally interconnected at the juncture of the rearmost portion of said front frame and an intermediate portion of said rear frame forward of said second transverse pivotal connection, and power means pivotally connected between said front and rear frames for tilting said frames in a vertical plane about said first and second pivotal connections and said pivotal juncture from a generally coplanar position to a jackknife position.

4. In a transporter vehicle comprising in combination, a chassis having front and rear frame members, said frames arranged so that the forward portion of said rear frame overlaps the rear portion of said forward frame, a first ground wheel assembly secured to said front frame by a first transverse pivotal connection, a second ground wheel assembly secured to said rear frame by a second transverse pivotal connection, said rear portion of said front frame being offset horizontally whereby said rear frame and the forward portion of said front frame lie in a common horizontal plane, said rear frame having a pair of parallel spaced apart downwardly depending rigid brackets located forwardly of said second pivotal connection, said brackets being pivotally connected by pins located at the rearmost point of said front frame, power means pivotally connected between said front and rear frames for tilting movement of said frames in a vertical plane about said first and second pivotal connections and said pins wherein said pin connection provides a pivotal relationship between said front and rear frame members and said brackets whereby upon said front and rear frame members being tilted from a generally horizontal coplanar position said rear frame pivots on said brackets and said first and second pivotal connections to place the vehicle in a jackknife position.

5. In a transporter vehicle comprising in combination, a chassis having front and rear frame members, said frames arranged so that the forward portion of said rear frame overlaps the rear portion of said forward frame, a first ground wheel assembly secured to said front frame by a first transverse pivotal connection, a second ground wheel assembly secured to said rear frame by a second transverse pivotal connection, said front and rear frames being pivotally interconnected at the juncture of the rearmost portion of said front frame and an intermediate portion of said rear frame forward of said second transverse pivotal connection, said rear portion of said front frame being offset horizontally whereby said rear frame and the forward portion of said front frame lie in a common horizontal plane, said rear frame having a downwardly sloping overhanging ramp portion disposed beyond and forming an extension of said rear frame, and power means pivotally connected between said front and rear frames for tilting said frames in a vertical plane about said first and second pivotal connections and said interconnected juncture from a generally coplanar position to a jackknife position whereby said ramp contacts the ground or supporting surface.

6. In a transporter vehicle comprising in combination, a chassis having front and rear frame members, said frames arranged so that the forward portion of said rear frame overlaps the rear portion of said forward frame, a first ground wheel assembly secured to said front frame by a first transverse pivotal connection, a second ground wheel assembly secured to said rear frame by a second transverse pivotal connection, said front and rear frames being pivotally interconnected at the juncture of the rearmost portion of said front frame and an intermediate portion of said rear frame forward of said second transverse pivotal connection, said rear portion of said front frame being offset horizontally whereby said rear frame and the forward portion of said front frame lie in a common horizontal plane, said rear frame having a downwardly sloping overhanging ramp portion disposed beyond and forming an extension of said rear frame, and power means pivotally connected between said front and rear frames for tilting said frames in a vertical plane about said first and second pivotal connections and said interconnected juncture, with said front frame thereby forming a first acute angle with the horizontal and said rear frame thereby forming a second acute angle with the horizontal that is substantially twice the first acute angle, thereby transforming the vehicle from a generally coplanar position to a jackknife position whereby said ramp contacts the ground or supporting surface.

7. In a transporter trailer comprising a tractor having an extended chassis forming a forward frame of said trailer, a second chassis portion of said trailer forming a rear frame of said trailer, said rear portion of said forward frame being offset horizontally from said rear frame wherein the forward frame and rear frame of said trailer lie in a common horizontal plane, said tractor and rear frame of said trailer having pivoted wheels thereon, said front and rear frames being pivotally interconnected at the juncture of the rearmost portion of said front frame and an intermediate portion of said rear frame forward of said pivoted wheels on said rear frame, and means for pivoting said juncture pivot and said pivoted wheels from a horizontal position to a jackknife position whereby said tractor pivoted wheels move rearwardly, said rear frame pivoted wheels move forwardly and said juncture pivot moves upwardly, tilting said rear frame of said trailer for easy access.

8. The transporter trailer as set forth in claim 7 wherein said pivoted wheels on the rear frame of said trailer are pivotally mounted on walking beams.

9. The transporter trailer as set forth in claim 7, wherein said rear frame has a downwardly extending ramp portion thereon.

References Cited by the Examiner
UNITED STATES PATENTS 2,595,474 5/1952 Marvin.
3,158,402 11/1964 Clement _____ 298—20

GERALD M. FORLENZA, *Primary Examiner.*